(12) United States Patent
Shimada et al.

(10) Patent No.: US 7,620,487 B2
(45) Date of Patent: Nov. 17, 2009

(54) ENGINE TORQUE CONTROL DEVICE

(75) Inventors: Tetsuya Shimada, Kitakatsushika-gun (JP); Masahiro Iriyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 522 days.

(21) Appl. No.: 11/245,190

(22) Filed: Oct. 7, 2005

(65) Prior Publication Data

US 2006/0080018 A1      Apr. 13, 2006

(30) Foreign Application Priority Data

Oct. 12, 2004   (JP)   .............................. 2004-297783

(51) Int. Cl.
G06F 19/00 (2006.01)
G06F 7/00 (2006.01)
G06F 17/00 (2006.01)

(52) U.S. Cl. .............................. 701/60; 701/51; 701/54; 701/55; 701/56; 701/58

(58) Field of Classification Search .................... 701/50, 701/51, 58, 62, 64, 65, 67, 68, 82, 84, 85, 701/87, 90, 94, 95; 477/70, 71, 73–75, 77–80, 477/83, 84, 86, 90, 91, 904
See application file for complete search history.

(56) References Cited

U.S. PATENT DOCUMENTS 5,012,695 A * 5/1991 Kyohzuka et al. ........... 477/102
6,231,479 B1 * 5/2001 Kraska et al. ............... 477/143
6,347,270 B1 * 2/2002 Takizawa et al. ............. 701/53
6,530,861 B1   3/2003 Nakashima
2003/0163235 A1   8/2003 Tokura et al.

FOREIGN PATENT DOCUMENTS

| JP | H02-085026 A | 3/1990 |
| JP | 2000-313251 A | 11/2000 |
| JP | 2001-328461 A | 11/2001 |

OTHER PUBLICATIONS

Roesch R et al., "Die elktronische Steuerung des automatischen Getriebes W5A 330/580 von Mercedes-Benz", ATZ Automobiltechnische Zeitschrift, Viewing Publishing, Nov. 1, 1995, pp. 736-738, 740, 740, XP000541586, vol. 97, No. 11, WiesBaden, Germany.

* cited by examiner

*Primary Examiner*—Khoi Tran
*Assistant Examiner*—Bhavesh V Amin
(74) *Attorney, Agent, or Firm*—Global IP Counselors, LLP

(57) ABSTRACT

An engine torque control device is configured to reduce shift shock while shortening shift time and improving shift response in an engine equipped with a shifting unit. In the engine torque control device engine output torque is subjected to feedback control so that the engine speed will be the target speed (synchronizing speed) after a downshift. The feedback control includes at least a proportional control and a differential control. The differential control is halted until the difference between the synchronizing speed and the actual engine speed is equal to or less than a specified value. Differential control is only performed at or below this specified value.

12 Claims, 5 Drawing Sheets

ENGINE TORQUE CONTROL DEVICE

CROSS-REFERENCE TO RELATED APPLICATIONS

This application claims priority under 35 U.S.C. § 119 to Japanese Patent Application No. 2004-297783. The entire disclosure of Japanese Patent Application No. 2004-297783 is hereby incorporated herein by reference.

BACKGROUND OF THE INVENTION

1. Field of the Invention

The present invention relates to an engine torque control device to which a shifting unit is linked, and more particularly relates to an engine torque control device that reduces shift shock during downshifting.

2. Background Information

An example of an engine torque control device that reduces shift shock is the one disclosed in Japanese Laid-Open Patent Publication No. 2001-328461. With this device, the throttle is fixed at a specific opening while the clutch is disengaged during a shift so that the synchronizing speed, which is used for synchronizing the engine speed to the clutch output speed, can be quickly attained. After which, the throttle opening is gradually returned from the specified opening to the opening corresponding to the synchronizing speed at the point when the difference between the engine speed and the synchronizing speed falls within a specific range. The clutch is engaged at the point when there is an inversion in the direction of change of the engine speed.

In view of the above, it will be apparent to those skilled in the art from this disclosure that there exists a need for an improved engine torque control device. This invention addresses this need in the art as well as other needs, which will become apparent to those skilled in the art from this disclosure.

SUMMARY OF THE INVENTION

It has been discovered that with the conventional device described above, since the throttle opening is fixed while the clutch is disengaged during a shift, control that is suited to all engine operating conditions cannot be performed, and there is the danger that engine speed will rise too high. Furthermore, since there is response lag in the engine speed with respect to the throttle opening command value, elevated engine speed cannot be quickly lowered, and as a result, the time it takes to reach the synchronizing speed, that is, the shift time, is longer, which adversely affects shift response.

The present invention was conceived in light of these problems encountered in the past. One object of the present invention is to provide an engine torque control device that reduces shift shock while improving shift response by shortening the shift time.

In order to achieve the object, the present invention provides an engine torque control device comprising a shifting control section and an engine output torque control section. The shifting control section is configured to selectively operate a clutch that is disengaged during a downshift to attain a neutral state of a shifting unit. The engine output torque control section is configured to perform feedback control of an engine output torque from an engine such that an actual engine speed approaches a target speed after downshifting, and the clutch is engaged to perform a shift after the engine speed has been synchronized. The engine output torque control section is further configured to perform the feedback control with at least a proportional control and a differential control, with the differential control being halted until a difference between the target speed and the actual engine speed is equal to or less than a specified value.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
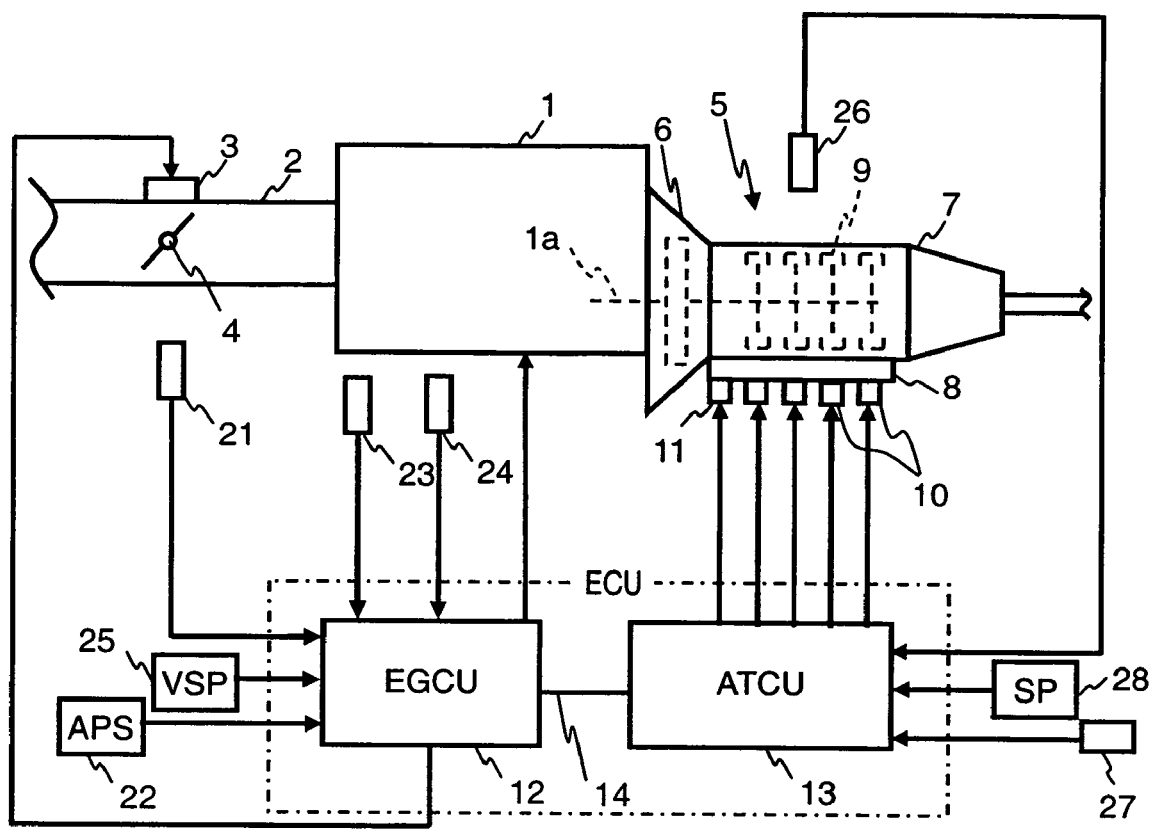
FIG. 1 is a schematic diagram of an internal combustion engine that is equipped with an engine torque control device or system in accordance with one embodiment of the present invention.

Referring initially to FIG. 1, an internal combustion engine 1 is schematically illustrated that is equipped with an engine torque control device or system in accordance with one embodiment of the present invention. In FIG. 1, the engine 1 receives intake air through an air intake passage 2 such that the intake air is supplied to each cylinder of the engine 1. The intake air passing through the air intake passage 2 to each cylinder is regulated by controlling a throttle motor 3 that operates a throttle valve 4. The operation of the throttle valve 4 by the throttle motor 3 can be accomplished in a conventional manner. Since operation of the throttle valve 4 by the throttle motor 3 can be accomplished in a conventional manner, these structures will not be discussed or illustrated in detail herein.

An automatic transmission 5 is linked to an output shaft 1a of the engine 1 in a conventional manner. This automatic transmission 5 has an automatic shift mode as well as a manual shift mode that allows the driver to shift manually. The automatic transmission 5 basically includes a torque converter 6, a shifting mechanism (gear mechanism) 7 and a hydraulic control mechanism 8. The torque converter 6 is linked to the output shaft 1a of the engine 1, with the shifting mechanism 7 being linked to the output side of this torque converter 6. The hydraulic control mechanism 8 is configured and arranged to engage and disengage various shift elements 9 (clutches, etc.) in the shifting mechanism 7.

The working hydraulic pressure of the hydraulic control mechanism 8 is controlled through various electromagnetic valves. The various electromagnetic valves are conventional components that are well known in the art. Since electromagnetic valves are well known in the art, these structures will not be discussed or illustrated in detail herein. Rather, only four shift solenoids 10 and a lock-up solenoid 11 will be depicted herein for the sake of simplicity and brevity. The shift solenoids 10 are configured and arranged to perform an automatic shifting operation. The lock-up solenoid 11 is configured and arranged to perform to lock up the torque converter 6 for transferring torque directly from the engine to the automatic transmission 5.

The operation of the engine 1 is controlled by an engine control unit (EGCU) 12, and the operation of the automatic transmission 5 is controlled by an automatic transmission control unit (ATCU) 13. The engine control unit 12 and the automatic transmission control unit 13 are connected by a communications line 14, allowing specific information, including detection signals, to be sent back and forth between the two. Thus, the shift solenoids 10 and the lock-up solenoid 11 are operatively connected to both the engine control unit 12 and the automatic transmission control unit 13 to selectively control the engagement and disengagement of the shift solenoids 10 and the lock-up solenoid 11 as explained below.

The engine control unit 12 preferably includes a microcomputer with an engine control program that controls the operation of the engine 1. Similarly, the automatic transmission control unit 13 preferably includes a microcomputer with an automatic transmission control program that controls the operation of the automatic transmission 5 and an automatic shifting control program that controls the shift solenoids 10 and the lock-up solenoid 11 as well as electromagnetic valves to perform upshifting and downshifting operations. The control units 12 and 13 also preferably include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the control units 12 and 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Moreover, the control units 12 and 13 can be integrated into a single electronic control unit ECU with one or more processors, as shown. In other words, the control units 12 and 13 can have separate components or can share components.

Various signals are inputted to the engine control unit 12 from various sensors including, but not limited to, a throttle sensor 21, an accelerator operation sensor 22, a water or coolant temperature sensor 23, an engine speed sensor 24, and a vehicle speed sensor 25. These signals are sent by the communications line 14 to the automatic transmission control unit 13 as needed and/or desired. The throttle sensor 21 is configured and arranged to detect throttle opening amount or degree of the throttle valve 4, and output a signal indicative of the throttle opening degree of the throttle valve 4 to the engine control unit 12. The accelerator operation sensor 22 is configured and arranged to detect the accelerator pedal depression amount APS, and output a signal indicative of the accelerator pedal depression amount APS to the engine control unit 12. The water or coolant temperature sensor 23 is configured and arranged to detect the engine cooling water or coolant temperature Tw, and output a signal indicative of the engine coolant temperature Tw to the engine control unit 12. The engine speed sensor 24 is configured and arranged to detect the engine speed Ne, and output a signal indicative of the engine speed Ne to the engine control unit 12. The vehicle speed sensor 25 is configured and arranged to detect the vehicle speed VSP, and output a signal indicative of the vehicle speed VSP to the engine control unit 12.

Various signals are inputted to the automatic transmission control unit 13 from various sensors including, but not limited to, a gear position sensor 26, a shift mode switch 27, and a shift position sensor 28. These signals are sent by the communications line 14 to the engine control unit 12 as needed and/or desired. The gear position sensor 26 is configured and arranged to detect the gear position Gp of the gear mechanism of the automatic transmission 5, and output a signal indicative of the gear position Gp to the automatic transmission control unit 13. The shift mode switch 27 is configured and arranged to set the shift mode (automatic shift mode or manual shift mode) of the automatic transmission 5, and output a signal indicative of the current shift mode to the automatic transmission control unit 13. The shift position sensor 28 is configured and arranged to detect the shift lever position SP, and output a signal indicative of the shift lever position SP to the automatic transmission control unit 13.

The engine control unit 12 executes engine control such as fuel injection control and ignition timing control on the basis of signals from the various sensors mentioned above, computes the target engine torque, and drives the throttle motor 3 to control the opening of the throttle valve 4 so that this target engine torque will be obtained (performs engine output torque control).

In automatic shift mode, meanwhile, the automatic transmission control unit 13 sets the optimal gear by referring to a preset map, etc., and controls the shift solenoids 10 so that the optimal gear is achieved, on the basis of the accelerator operation amount APS and the vehicle speed VSP. In manual shift mode, the automatic transmission control unit 13 sets the gear to one gear higher or one gear lower than the current gear, according to whether the driver has used the shift lever to make an upshift or a downshift, and controls the shift solenoids 10 so that the selected gear is achieved.

Furthermore, in manual shift mode, when a downshift operation is detected (that is, when there is a downshift requirement), cooperative control by the engine control unit 12 and the automatic transmission control unit 13 results in disengagement of the clutches that are engaged for the current (pre-shift) gear, so that a neutral state is attained, and in computation of the post-shift target engine speed (hereinafter referred to as target synchronizing speed), and control of engine output torque so that the actual engine speed rNe becomes the target synchronizing speed tNe, after which the clutches for the post-shift gear are engaged, thereby reducing shift shock during a downshift.

Figure 2:
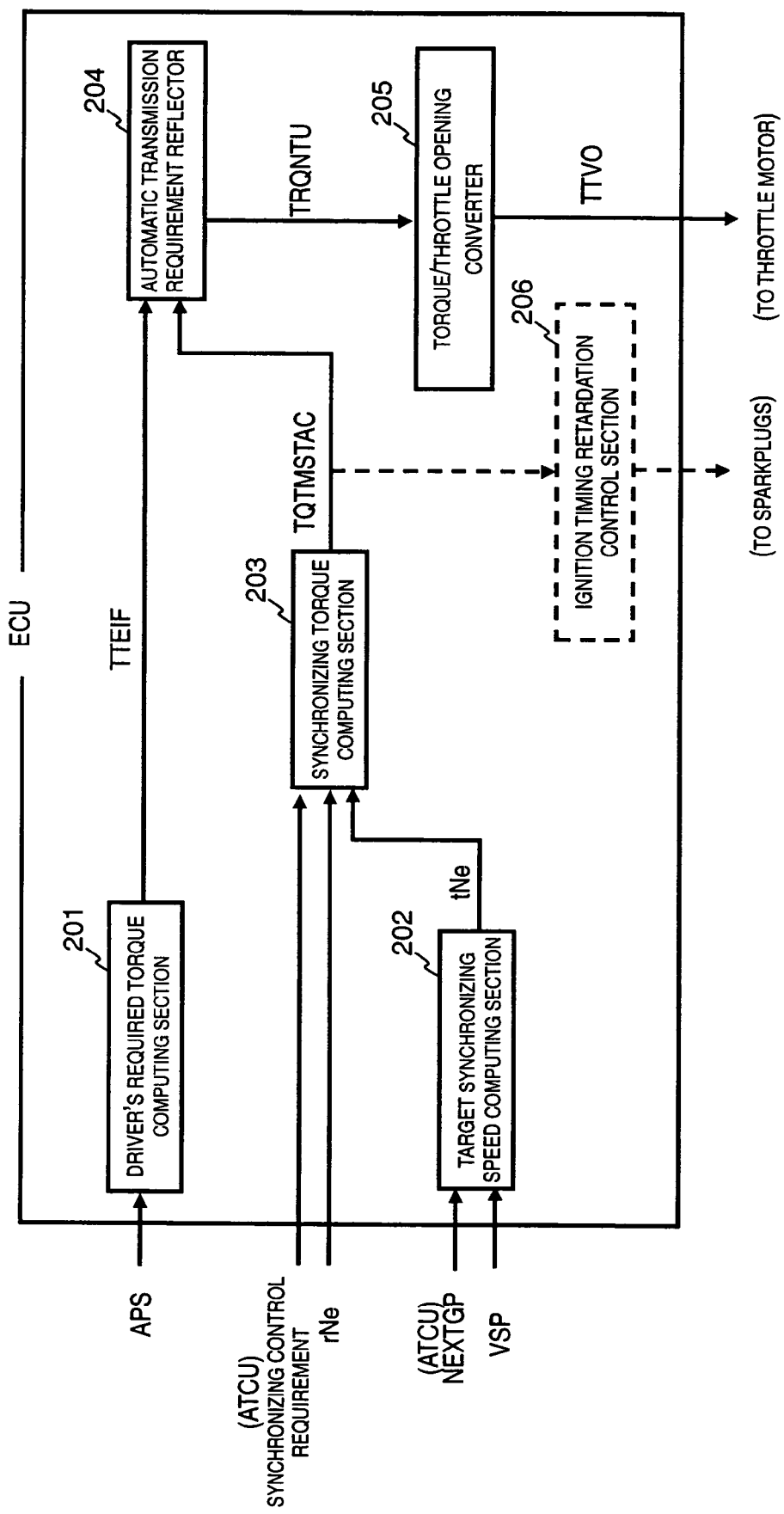
FIG. 2 is a simplified block diagram illustrating engine output torque control during a shift operation using the engine torque control device in accordance with one embodiment of the present invention.

The engine output torque control executed by the engine control unit 12 will now be described with reference to FIG. 2. FIG. 2 is a simplified block diagram of the engine output control executed by the engine control unit 12 during a downshift operation. As shown in FIG. 2, the engine output control functions of the engine control unit 12 include a driver's required torque computing section 201, a target synchronizing speed computing section 202, a synchronizing torque computing section 203, an automatic transmission requirement reflector 204 and a torque/throttle opening converter 205. With this configuration of the present invention, as explained below, differential control is halted and feedback control involving proportional control is executed until the engine speed reaches the target speed is reached and until a specified value (speed) is attained, and at the point when the target speed has been reached and the specified value attained, differential control is added and feedback control involving proportional control and differential control is executed. As a result, the engine speed elevation rate is kept high right up until just before the engine speed reaches the target speed, and the engine speed elevation rate is lowered just before the target speed is reached, thereby suppressing overshoot, so a reduction in shift shock and an improvement in shift response can be achieved.

In FIG. 2, the driver's required torque computing section 201 is configured to compute the engine output torque (required engine torque) TTEIF required by the driver on the basis of the accelerator operation amount APS. Then, this required engine torque TTEIF is outputted to the automatic transmission requirement reflector 204.

The target synchronizing speed computing section 202 is configured to compute a target synchronizing speed tNe from the vehicle speed VSP and the post-shift gear position (gear ratio) NEXTGP inputted from the automatic transmission control unit 13. The target synchronizing speed computing section 202 is then configured to output this target synchronizing speed tNe to the synchronizing torque computing section 203.

In addition to the target synchronizing speed tNe from the target synchronizing speed computing section 202, the synchronizing torque computing section 203 receives a synchronizing control requirement (e.g., synchronizing control command) from the automatic transmission control unit 13 and the actual engine speed rNe. The synchronizing torque computing section 203 is configured to compute the engine output torque (hereinafter referred to as synchronizing torque) TQTMSTAC used for bringing the actual engine speed rNe to the target synchronizing speed tNe. The synchronizing torque computing section 203 is configured to output this synchronizing torque TQTMSTAC to the automatic transmission requirement reflector 204. The synchronizing control command is outputted from the automatic transmission control unit 13 when there is a downshift requirement in manual shift mode. The computation of the synchronizing torque TQTMSTAC will be discussed below (see FIG. 3).

The automatic transmission requirement reflector 204 is configured to compare the inputted driver's required torque TTEIF and the synchronizing torque TQTMSTAC and selects the larger of the two, and outputs the selected torque as the target engine torque TRQNTU to a torque/throttle opening converter 205. As a rule, what is outputted as the target engine torque TRQNTU is the synchronizing torque TQTMSTAC when there is a downshift requirement in the manual shift mode, and the driver's required torque TTEIF when there is no downshift requirement in the manual shift mode or when in the automatic shift mode.

The torque/throttle opening converter 205 is configured to set a target throttle opening TTVO so that the inputted target engine torque TRQNTU will be obtained (i.e., converts the target engine torque to a throttle opening), and outputs this target throttle opening TTVO to the throttle motor 3. As a result, the throttle motor 3 drives the throttle valve 4 so as to achieve the target throttle opening TTVO. Although not shown in the drawings, a failsafe controller may be provided so that if the target engine torque TRQNTU exhibits an abnormal value due to circuit malfunction, noise, or the like, this output value will be limited, for example.

Figure 3:
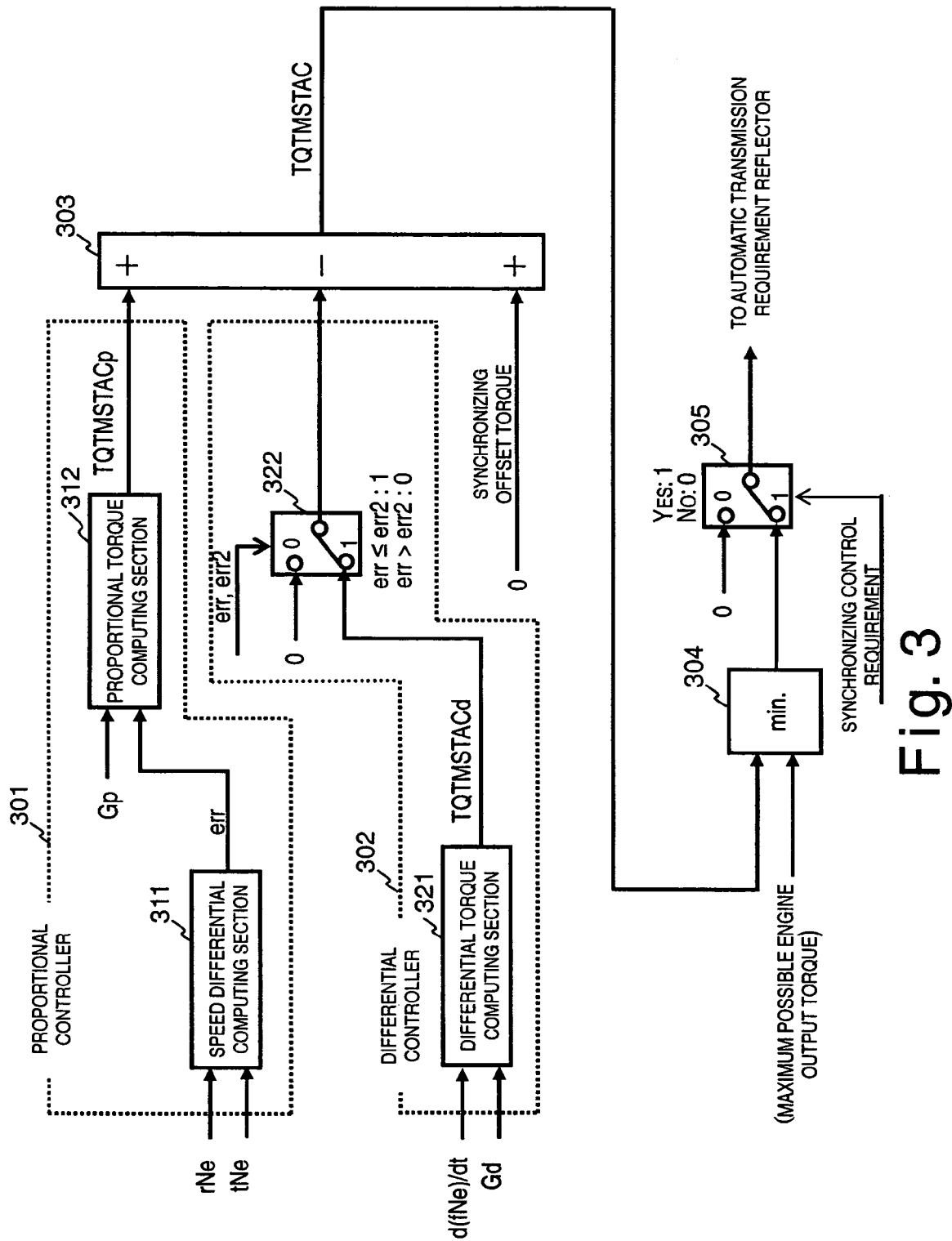
FIG. 3 is a block diagram of the details involved in the computation of the synchronizing torque by the synchronizing torque computing section.

FIG. 3 is a block diagram of the details involved in the computation of the synchronizing torque TQTMSTAC executed by the synchronizing torque computing section 203.

As shown in FIG. 3, the synchronizing torque computing section 203 is configured to subject the engine output torque to feedback control using proportional control and differential control. Therefore, the synchronizing torque computing section 203 comprises a proportional controller 301 (comprising a speed differential computing section 311 and a proportional torque computing section 312), a differential controller 302 (comprising a differential torque computing section 321 and an output switching section 322), a control torque computing section 303, a comparator 304, and a synchronizing torque output section 305.

The speed differential computing section 311 is configured to compute the speed difference err between the inputted target synchronizing speed tNe and the actual engine speed rNe (i.e., err=tNe−rNe). The speed differential computing section 311 then outputs the speed difference err to the proportional torque computing section 312.

The proportional torque computing section 312 is configured to compute the proportional torque TQTMSTACp from the inputted speed differential (tNe−rNe) and the proportional gain Gp (i.e., TQTMSTACp=Gp×err). The proportional torque computing section 312 then outputs this proportional torque TQTMSTACp to the control torque computing section 303. Here, high-gain proportional control is performed in an effort to more quickly bring the actual engine speed rNe to the target synchronizing speed tNe.

Meanwhile, the differential torque computing section 321 is configured to compute the differential torque TQTMSTACd from the differential value d(rNe)/dt of the inputted actual engine speed and the differential gain Gd (i.e., TQTMSTACd (=Gd×d(rNe)/dt). The differential torque computing section 321 then outputs this differential torque TQTMSTACd to the output switching section 322.

The output switching section 322 is configured to select either "0" or the differential torque TQTMSTACd according to determination results on the basis of the speed difference err and the actual engine speed rNe. The output switching section 322 then outputs this selection to the control torque computing section 303. More specifically, a differential added speed difference err2 is computed through reference to the map shown in FIG. 4 (differential added speed difference setting map) that is based on the actual engine speed rNe. Thus, the differential added speed difference err2 is compared with the speed difference err by the output switching section 322. Until the speed difference err is equal to or less than the differential added speed difference err2 (i.e., until the actual engine speed rNe reaches the differential added speed obtained by subtracting the differential added speed difference err2 from the target synchronizing speed tNe), the output switching section 322 outputs "0". The differential torque TQTMSTACd is thus only outputted at the point when the speed difference err is equal to or less than the differential added speed difference err2 (when the actual engine speed reaches the differential added speed).

Figure 4:
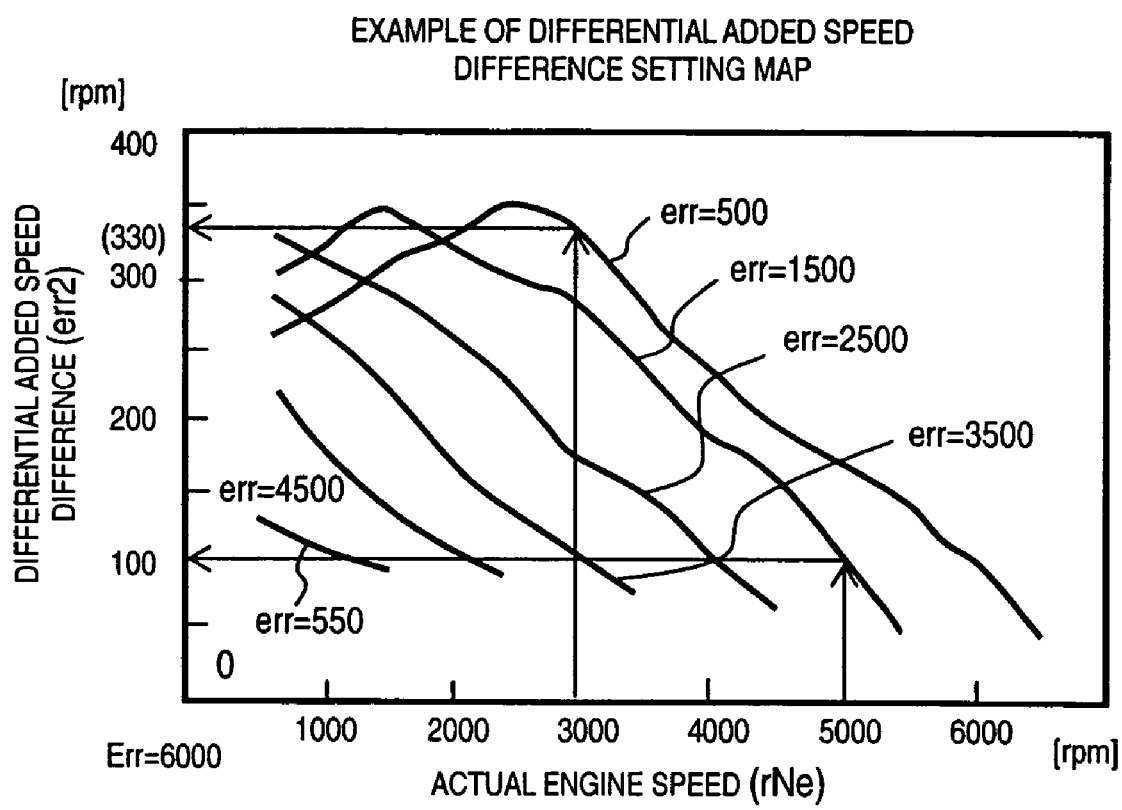
FIG. 4 is an example of a differential added speed difference setting map used by the engine torque control device in accordance with one embodiment of the present invention.

For example, in FIG. 4, if the target synchronizing speed tNe is 6500 rpm, and the actual engine speed rNe is 5000 rpm, then the engine speed that has to be changed is 1500 rpm (i.e., the speed difference err). Thus, the differential added speed difference err2 is approximately 100 rpm, when the actual engine speed rNe is 5000 rpm. In this case, the output switching section 322 outputs "0" since the speed difference err is greater than 100 rpm (until the actual engine speed rNe reaches 5900 rpm). The output switching section 322 will then only output the differential torque TQTMSTACd at the point when the speed difference err is equal to or less than 100 rpm (when the actual engine speed rNe reaches 5900 rpm). If the target synchronizing speed tNe is 3500 rpm, and the actual engine speed rNe is 3000 rpm, then the speed difference err is 500 rpm). Thus, the differential added speed difference err2 is approximately 330 rpm, when the actual engine speed rNe is 3000 rpm. In this case, the output switching section 322 outputs "0" if the speed difference err is greater than 330 rpm (until the actual engine speed rNe reaches 3170 rpm), and only outputs the differential torque TQTMSTACd at the point when the speed difference err is equal to or less than 330 rpm (when the actual engine speed rNe reaches 3170 rpm).

Put another way, the differential added speed difference setting map shown in FIG. 4 is created from the standpoint that differential torque is reflected when the more readily the engine speed will be raised by the proportional torque TQTMSTACp (the speed difference and the actual engine speed), the farther away the actual engine speed will be from the target synchronizing speed, and differential torque is reflected when the less readily the engine speed will be raised, the closer the actual engine speed will be to the target synchronizing speed. The timing at which the differential torque TQTMSTACd is reflected (addition of differential control) is suitably controlled by referring to this map.

The control torque computing section 303 is configured to add the proportional torque TQTMSTACp and the synchronizing offset torque to the current synchronizing torque TQTMSTAC, and then subtract the output from the output switching section 322, thereby refreshing the synchronizing torque TQTMSTAC. The refreshed synchronizing torque TQTMSTAC is outputted to the comparator 304. Here, the synchronizing offset torque is provided instead of not using integral control (that is, not computing the integral torque), and is "0" in this embodiment.

Therefore, when the speed difference err is greater than the differential added speed difference err2, the synchronizing torque TQTMSTAC, which is equal to TQTMSTAC (previous value)+Gp×err, is outputted from the control torque computing section 303. However, when the speed difference err is less than or equal to the differential added speed difference err2, the synchronizing torque TQTMSTAC, which is equal to TQTMSTAC (previous value)+Gp×err−Gd×d(rNe)/dt, is outputted for the control torque computing section 303.

The synchronizing offset torque is given as "0" in this embodiment. However, the synchronizing offset torque can be a value other than zero, or can be set as a variable according to the speed difference err, and integral control (in addition to the above-mentioned proportional control and differential control) can be used.

The comparator 304 is configured to compare the inputted synchronizing torque TQTMSTAC and the maximum possible engine output torque, select the smaller of the two, and then output this selected torque to the synchronizing torque output section 305.

The synchronizing torque output section 305 is configured to select either "0" or the inputted synchronizing torque TQTMSTAC according to whether or not there is a synchronizing control requirement (synchronizing control command) from the automatic transmission control unit 13. The synchronizing torque output section 305 then outputs this selection to the automatic transmission requirement reflector 204 (see FIG. 2).

Figure 5:
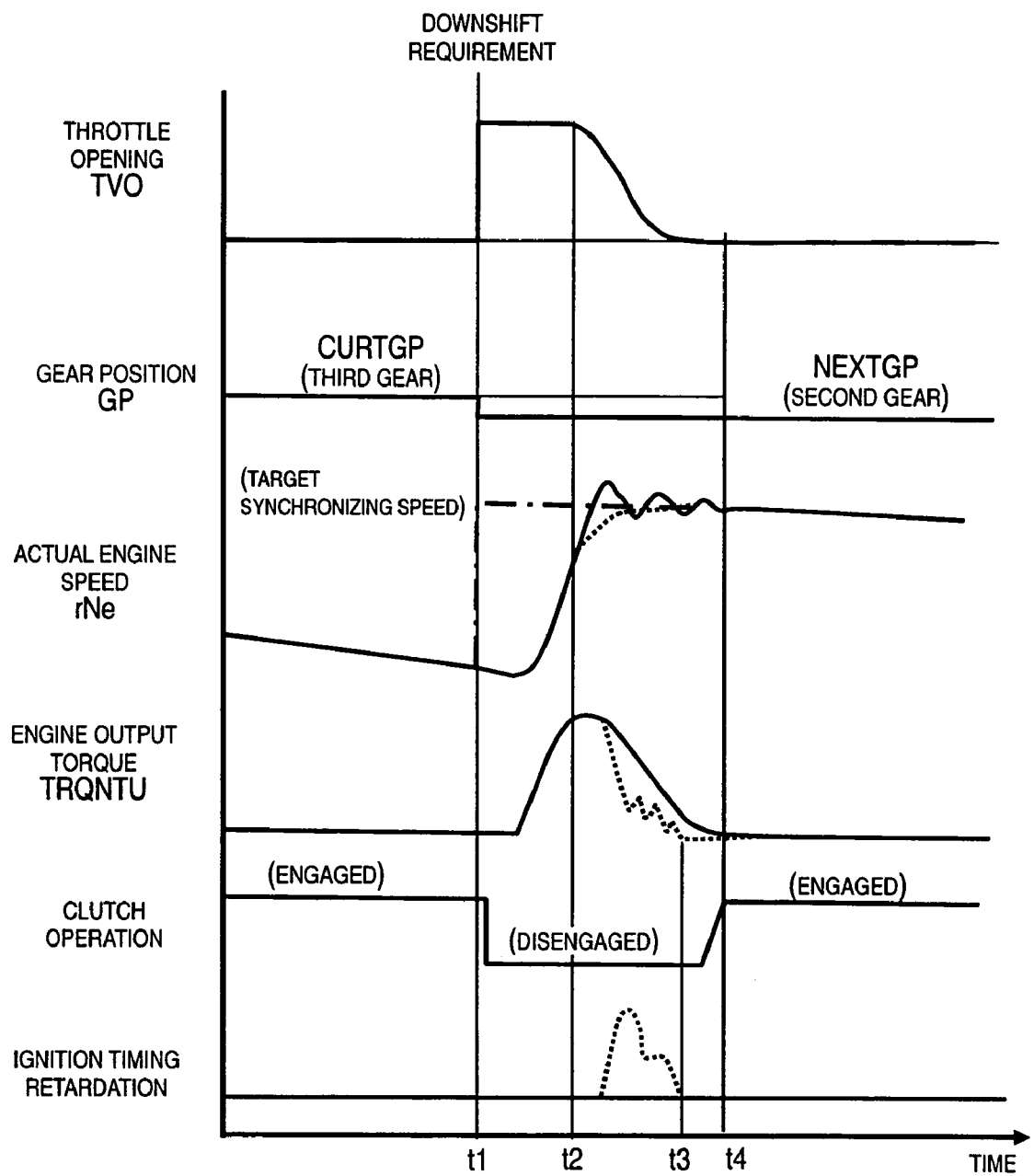
FIG. 5 is a time chart showing the control characteristics of selected vehicle parameter occurring during in a downshift.

FIG. 5 is a time chart of the engine output torque control when there is a downshift requirement.

When there is a downshift requirement (such as from third gear to second gear) (time t1), the target synchronizing speed tNe (the post-shift engine speed) is computed, and the proportional torque TQTMSTACp is outputted as the target engine torque TRQNTU on the basis of the difference between the target synchronizing speed tNe and the actual engine speed rNe (see FIGS. 2 and 3). Here, the proportional controller 301 is designed to perform high-gain proportional control as discussed above, and the opening of the throttle valve 4 is controlled to become larger (in the drawing, the throttle is shown completely open as an example). As a result, the actual engine speed rNe quickly begins to rise toward the target synchronizing speed tNe. Also, at this point, a clutch disengagement command is outputted from the automatic transmission control unit 13 to the solenoids 9 and 10 of the automatic transmission 5, and the third-gear clutch is disengaged.

After this, the actual engine speed rNe rises, and when the speed difference err is less than or equal to the differential added speed difference err2 (when the actual engine speed reaches the differential added speed difference), the synchronizing torque TQTMSTAC reflecting the differential torque TQTMSTACd is outputted to the target engine torque TRQNTU (time t2). That is, until the actual engine speed rNe reaches the differential added speed difference, the engine speed is quickly raised by the proportional torque TQTMSTACp, but after the differential added speed difference has been reached, the differential torque TQTMSTACd is further reflected (substracted), resulting in a slower rise in engine speed, which helps prevent overshoot.

Once the actual engine speed rNe matches the target synchronizing speed tNe, a clutch engagement command is outputted from the automatic transmission control unit 13 to the solenoids 9 and 10 of the automatic transmission 5, and the shift is concluded (time t4).

Although not described in detail, an ignition timing retardation control section 206 can also be used (see the dotted lines in FIGS. 2 and 5), in which the engine output torque is reduced by a retarded ignition timing to be simultaneous with or slightly behind the latter half of the clutch disengagement period, such as the timing at which the differential torque is reflected. Doing this allows the engine speed to be quickly reduced by retardation of the ignition timing, so the engine speed can be matched to the target synchronizing speed more quickly (time t3) than with throttle control alone.

With the embodiment described above, when there is a downshift requirement in the manual shift mode, if the speed difference err between the target synchronizing speed tNe and the actual engine speed rNe is greater than the differential added speed difference err2, then the engine output torque is subjected to feedback control by proportional control on the basis of the speed difference err. Differential control is added at the point when the speed difference err becomes equal to or less than the differential added speed difference err2, and then the engine output torque is subjected to feedback control by proportional control and differential control. This keeps overshoot to a minimum, and improves matching to the target synchronizing speed. Another advantage is that, since the feedback control does not include integral control in this case, the control is simpler, although integral control may, of course, be performed.

The above-mentioned specified value is set to an amount at which feedback control by proportional control is switched to feedback control by proportional control and differential control. However, this specified value is not a fixed value, and is set on the basis of the actual engine speed rNe and the speed difference err. Consequently, differential torque can be reflected when the more readily the engine speed is raised, the farther away the actual engine speed is from the target synchronizing speed, and differential torque can be reflected when the less readily the engine speed is raised, the closer the actual engine speed is to the target synchronizing speed. Since the reflection of differential torque (switching of control) according to the state here can be performed at a suitable timing, there is an improvement in matching the target synchronizing speed and in the shift response.

Also, if ignition timing retardation control is also used in addition to reflecting the differential torque, either at the point when the speed difference err drops to or below the differential added speed difference err2, or thereafter, the response of engine speed will be better than with throttle control alone, so overshoot can be better avoided. Thus, there is a further improvement in matching the target synchronizing speed and in the shift response.

As used herein to describe the above present invention, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine torque control device comprising:
    a shifting control section configured to selectively disengage a clutch during a downshift operation to attain a neutral state of a shifting unit and engage the clutch to complete the downshift operation after an actual engine speed has been synchronized to a target speed of the downshift operation; and
    an engine output torque control section configured to selectively perform first and second feedback controls of an engine output torque from an engine during the downshift operation such that the actual engine speed approaches the target speed of the downshift operation,
    the engine output torque control section being further configured to switch the first feedback control to the second feedback control when a difference between the target speed and the actual engine speed is equal to or less than a specified value during the downshift operation,
    the second feedback control being different from the first feedback control, and the second feedback control being performed by at least a proportional control and a differential control to control the engine output torque from the engine during the downshift operation,
    the first feedback control being performed by control other than differential control prior to switching to the second feedback control.

2. The engine torque control device according to claim 1, wherein
    the engine output torque control section is further configured to perform the first feedback control of the engine output torque using the proportional control if the difference is over the specified value, and after the difference becomes equal to or less than the specified value, the second feedback control of the engine output torque is performed by the proportional control and the differential control.

3. The engine torque control device according to claim 1, wherein
    the engine output torque control section is further configured to perform the first feedback control of the engine output torque using the proportional control and an integral control if the difference is over the specified value, and after the difference becomes equal to or less than the specified value, the second feedback control of the engine output torque is performed by the proportional control, the integral control, and the differential control.

4. The engine torque control device according to claim 1, wherein
    the engine output torque control section is further configured to set the specified value according to the actual engine speed and to the difference between the actual engine speed and the target speed.

5. The engine torque control device according to claim 1, further comprising
    an ignition timing retardation control section configured to perform an ignition timing retardation control after the difference becomes equal to or less than the specified value.

6. The engine torque control device according to claim 2, wherein
    the engine output torque control section is further configured to set the specified value according to the actual engine speed and to the difference between the actual engine speed and the target speed.

7. The engine torque control device according to claim 2, further comprising
    an ignition timing retardation control section configured to perform an ignition timing retardation control after the difference becomes equal to or less than the specified value.

8. The engine torque control device according to claim 3, wherein
    the engine output torque control section is further configured to set the specified value according to the actual engine speed and to the difference between the actual engine speed and the target speed.

9. The engine torque control device according to claim 3, further comprising
    an ignition timing retardation control section configured to perform an ignition timing retardation control after the difference becomes equal to or less than the specified value.

10. The engine torque control device according to claim 4, further comprising
    an ignition timing retardation control section configured to perform an ignition timing retardation control after the difference becomes equal to or less than the specified value.

11. An engine torque control device comprising:

shifting control means for selectively disengaging a clutch during a downshift operation to attain a neutral state of a shifting unit and engaging the clutch to complete the downshift operation after an actual engine speed has been synchronized to a target speed of the downshift operation; and engine output torque control means for selectively performing first and second feedback controls of an engine output torque from an engine during the downshift operation such that the actual engine speed approaches the target speed of the downshift operation, and for switching the first feedback control to the second feedback control when a difference between the target speed and the actual engine speed is equal to or less than a specified value during the downshift operation, the second feedback control being different from the first feedback control, and the second feedback control being performed by at least a proportional control and a differential control to control the engine output torque from the engine during the downshift operation, the first feedback control being performed by control other than differential control prior to switching to the second feed back control.

12. A method of controlling engine torque comprising:

selectively disengaging a clutch during a downshift operation to attain a neutral state of a shifting unit and engaging the clutch to complete the downshift operation after an actual engine speed has been synchronized to a target speed of the downshift operation;

selectively performing first and second feedback controls of an engine output torque from an engine during the downshift operation such that the actual engine speed approaches the target speed of the downshift operation; and switching the first feedback control to the second feedback control when a difference between the target speed and the actual engine speed is equal to or less than a specified value during the downshift operation, the second feedback control being different from the first feedback control, and the second feedback control being performed by at least a proportional control and a differential control to control the engine output torque from the engine during the downshift operation, the first feedback control being performed by control other than differential control prior to switching to the second feedback control.

* * * * *